(12) United States Patent
Yan et al.

(10) Patent No.: US 11,397,485 B2
(45) Date of Patent: Jul. 26, 2022

(54) CIRCUIT CONTROL METHOD AND CONTROL DEVICE, DISPLAY MODULE AND DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Bingbing Yan, Beijing (CN); Chunyang Nie, Beijing (CN); Ke Dai, Beijing (CN); Lixin Zhu, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/963,903

(22) PCT Filed: Feb. 6, 2020

(86) PCT No.: PCT/CN2020/074377
§ 371 (c)(1),
(2) Date: Jul. 22, 2020

(87) PCT Pub. No.: WO2020/215851
PCT Pub. Date: Oct. 29, 2020

(65) Prior Publication Data
US 2021/0232248 A1    Jul. 29, 2021

(30) Foreign Application Priority Data
Apr. 25, 2019 (CN) .......................... 201910337431.X

(51) Int. Cl.
*G06F 3/041* (2006.01)

(52) U.S. Cl.
CPC ........ *G06F 3/0412* (2013.01); *G06F 3/04166* (2019.05)

(58) Field of Classification Search
CPC ..... G06F 3/0412; G06F 3/04166; G06F 3/044
See application file for complete search history.

(56) References Cited

U.S. PATENT DOCUMENTS

| 10,139,952 B2 | 11/2018 | Takeuchi et al. |
| 10,198,064 B2 | 2/2019 | Kwon et al. |

(Continued)

FOREIGN PATENT DOCUMENTS

| CN | 101893777 A | 11/2010 |
| CN | 101983372 A | 3/2011 |

(Continued)

OTHER PUBLICATIONS

First Office Action dated Apr. 30, 2020, relating to CN Patent Application No. 201910337431.X.

(Continued)

*Primary Examiner* — Robin J Mishler
(74) *Attorney, Agent, or Firm* — Dinsmore & Shohl LLP

(57) ABSTRACT

The present disclosure provides a circuit control method and a control device, a display module and a display device. The circuit control device is used for acquiring an indication signal for indicating whether a user performs touch operation on the touch panel or not; the current is provided for the driving circuit according to the indication signal, a first current is provided for the driving circuit under the condition that a user does not carry out touch operation on the touch panel, a second current is provided for the driving circuit under the condition that the user carries out touch operation on the touch panel, and the second current is larger than the first current.

16 Claims, 3 Drawing Sheets

(56) References Cited

U.S. PATENT DOCUMENTS

| | | |
|---|---|---|
| 10,802,628 B2 | 10/2020 | Zou |
| 10,891,002 B2 | 1/2021 | Feng |
| 2009/0251436 A1 | 10/2009 | Keskin |
| 2012/0054379 A1 | 3/2012 | Leung et al. |
| 2015/0002462 A1 | 1/2015 | Zhao et al. |
| 2017/0031504 A1 | 2/2017 | Hwang |
| 2018/0182342 A1* | 6/2018 | Li .................. G09G 3/3685 |
| 2019/0064982 A1 | 2/2019 | Ito et al. |
| 2019/0235679 A1* | 8/2019 | Zou ................ G09G 3/3241 |
| 2020/0218420 A1* | 7/2020 | Feng ............. G06F 3/04166 |

FOREIGN PATENT DOCUMENTS

| | | |
|---|---|---|
| CN | 203338322 U | 12/2013 |
| CN | 105788546 A | 7/2016 |
| CN | 106205521 A | 12/2016 |
| CN | 106406604 A | 2/2017 |
| CN | 106933369 A | 7/2017 |
| CN | 106933405 A | 7/2017 |
| CN | 107272965 A | 10/2017 |
| CN | 107678584 A | 2/2018 |
| CN | 108154843 A | 6/2018 |
| CN | 108664163 A | 10/2018 |
| CN | 110083268 A | 8/2019 |

OTHER PUBLICATIONS

Second Office Action dated Feb. 3, 2021, relating to CN Patent Application No. 201910337431.X.

* cited by examiner

CIRCUIT CONTROL METHOD AND CONTROL DEVICE, DISPLAY MODULE AND DISPLAY DEVICE

CROSS-REFERENCE TO RELATED APPLICATIONS

The present application is a U.S. National Stage Application under 35 U.S.C. § 371 of International Patent Application No. PCT/CN2020/074377, filed on Feb. 6, 2020, which is based on and claims priority from the application with CN application No. 201910337431.X filed on Apr. 25, 2019, the disclosure of both of which are hereby incorporated into this disclosure by reference in its entirety.

TECHNICAL FIELD

The present disclosure relates to the field of display technologies, and in particular, to a circuit control method and a control device, a display module and a display device.

BACKGROUND

In the related art, a driving circuit is used for providing a drive current to a touch panel. Under the condition that a user does not perform touch operation on the touch panel, the drive current is used for display driving of the touch panel within one frame scanning time period. Under the condition that the user performs touch operation on the touch panel, the drive current is used for the display driving of the touch panel in one part of the one frame scanning time period, and is used for the touch driving of the touch panel in the other part of the one frame scanning time period.

SUMMARY

According to a first aspect of an embodiment of the present disclosure, there is provided a circuit control method comprising: acquiring an indication signal for indicating whether a user performs touch operation on a touch panel; and providing a current to a driving circuit according to the indication signal, wherein a first current is provided to the driving circuit under the condition that the user does not perform touch operation on the touch panel, and a second current larger than the first current is provided to the driving circuit under the condition that the user performs touch operation on the touch panel.

In some embodiments, wherein the providing the current to the driving circuit comprises: controlling a first current source to provide the first current to the driving circuit under the condition that the user does not perform touch operation on the touch panel; and controlling a second current source to provide the second current to the driving circuit under the condition that the user performs touch operation on the touch panel.

In some embodiments, the user is determined to not perform a touch operation on the touch panel under the condition that the indication signal is at a first level; and the user is determined to perform touch operation on the touch panel under the condition that the indication signal is at a second level greater than the first level.

According to a second aspect of the embodiments of the present disclosure, there is provided a circuit control device comprising: an acquisition circuit configured to acquire an indication signal for indicating whether a user performs touch operation on a touch panel; and a control circuit configured to provide a current to a driving circuit according to the indication signal, wherein a first current is provided to the driving circuit under the condition that the user does not perform touch operation on the touch panel, and a second current larger than the first current is provided to the driving circuit under the condition that the user performs touch operation on the touch panel.

In some embodiments, the control circuit is configured to control a first current source to provide the first current to the driving circuit under the condition that the user does not perform touch operation on the touch panel, and to control a second current source to provide the second current to the driving circuit under the condition that the user performs touch operation on the touch panel.

In some embodiments, the control circuit is configured to determine the user does not perform a touch operation on the touch panel under the condition that the indication signal is at a first level, and to determine the user performs touch operation on the touch panel under the condition that the indication signal is at a second level greater than the first level.

According to a third aspect of the embodiments of the present disclosure, there is provided a circuit control device comprising: a memory configured to store instructions; a processor coupled to the memory, wherein based on instructions stored by the memory, the processor is configured to: acquire an indication signal for indicating whether a user performs touch operation on a touch panel; and provide a current to a driving circuit according to the indication signal, wherein a first current is provided to the driving circuit under the condition that the user does not perform touch operation on the touch panel, and a second current larger than the first current is provided to the driving circuit under the condition that the user performs touch operation on the touch panel.

In some embodiments, the processor is further configured to: control a first current source to provide the first current to the driving circuit under the condition that the user does not perform touch operation on the touch panel; and control a second current source to provide the second current to the driving circuit under the condition that the user performs touch operation on the touch panel.

In some embodiments, the processor is further configured to: determine the user does not perform a touch operation on the touch panel under the condition that the indication signal is at a first level; and determine the user performs touch operation on the touch panel under the condition that the indication signal is at a second level greater than the first level.

According to a fourth aspect of the embodiments of the present disclosure, there is provided a time sequence control circuit, comprising the circuit control device according to any one of the aforementioned embodiments, a first current source configured to provide a first current to a driving circuit under the control of the circuit control device; and a second current source configured to provide a second current to the driving circuit under the control of the circuit control device.

According to a fifth aspect of the embodiments of the present disclosure, there is provided a display module, comprising the time sequence control circuit according to any of the aforementioned embodiments; a touch panel; a touch circuit configured to detect whether a user performs touch operation on the touch panel and send indication information corresponding to a detection result to the time sequence control circuit; and a driving circuit configured to drive the touch panel using a current obtained under control of the time sequence control circuit.

In some embodiments, the driving circuit is configured to use a first current for display driving of the touch panel under the condition that the obtained current is the first current.

In some embodiments, the driving circuit is configured to use a first portion of a second current for display driving of the touch panel and a second portion of the second current for touch driving of the touch panel under the condition that the obtained current is the second current greater than the first current.

In some embodiments, the touch panel is an in-cell touch panel.

According to a sixth aspect of the embodiments of the present disclosure, there is provided a display device comprising the display module according to any one of the aforementioned embodiments.

According to a seventh aspect of the embodiments of the present disclosure, a non-transitory computer-readable storage medium that stores computer instructions which, when executed by a processor, implement the method according to any one of the aforementioned embodiments.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which are incorporated in and constitute a part of this specification, illustrate embodiments of the disclosure and together with the description, serve to explain the principles of the disclosure.

The present disclosure may be more clearly understood from the following detailed description taken in conjunction with the accompanying drawings, in which.

It should be understood that the dimensions of the various parts shown in the drawings are not drawn according to the actual. Further, the same or similar reference numerals denote the same or similar components.

DETAILED DESCRIPTION

Various exemplary embodiments of the present disclosure will now be described in detail with reference to the accompanying drawings. The description of the exemplary embodiments is merely illustrative and is in no way intended to limit the disclosure, its application, or uses. The present disclosure may be embodied in many different forms and is not limited to the embodiments described herein. These embodiments are provided so that this disclosure will be thorough and complete, and will fully convey the scope of the disclosure to those skilled in the art. It should be noted that: the relative arrangement of parts and steps, the composition of materials and values set forth in these embodiments are to be construed as illustrative only and not as limiting unless otherwise specifically stated.

The use of "first", "second", and similar words in this disclosure is not intended to indicate any order, quantity, or importance, but rather is used to distinguish one element from another. The word "comprise" or "include", and the like, means that the element preceding the word comprises the element listed after the word, and does not exclude the possibility that other elements may also be included.

All terms (including technical or scientific terms) used herein have the same meaning as commonly understood by one of ordinary skill in the art to which this disclosure belongs unless specifically defined otherwise. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Techniques, methods, and apparatus known to one of ordinary skill in the relevant art may not be discussed in detail but are intended to be part of the specification where appropriate.

The inventors found through research that under the condition that a user performs a touch operation on the touch panel, the time for display driving is short within one frame scanning time period, resulting in insufficient panel charging. In order to solve this problem, the driving current provided by the driving circuit is increased in the related art. Increasing the drive current will cause the power consumption of the drive circuit to be larger, and it will also cause the drive circuit to overheat, which will bring potential safety hazards.

Accordingly, the present disclosure provides a solution capable of reducing power consumption of a driving circuit while ensuring normal operation of a touch panel.

Figure 1:
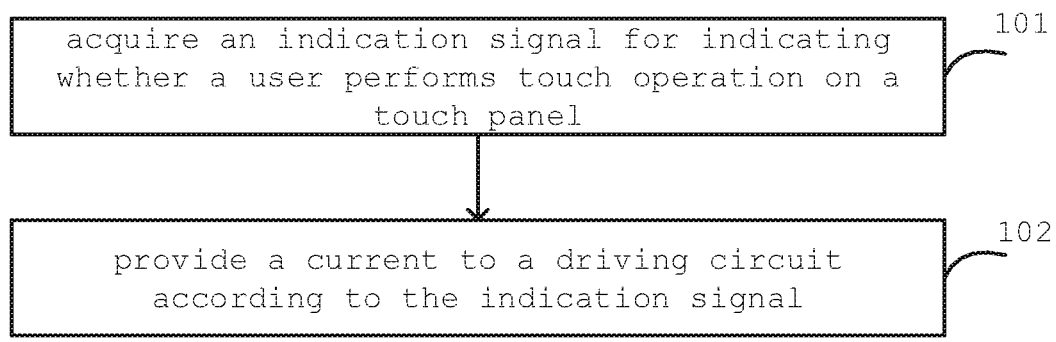
FIG. 1 is a schematic flow diagram of a circuit control method according to one embodiment of the present disclosure.

FIG. 1 is a schematic flow diagram of a circuit control method according to one embodiment of the present disclosure. In some embodiments, the circuit control method is performed by a circuit control device.

In step 101, an indication signal for indicating whether a user performs a touch operation on a touch panel is acquired.

In some embodiments, a touch circuit is used for detecting whether a user performs a touch operation on the touch panel, and outputting corresponding indication information according to a detection result. For example, under the condition that the user does not perform a touch operation on the touch panel, the indication signal output by the touch circuit is at a first level. Under the condition that the user performs touch operation on the touch panel, the touch circuit outputs a second level. The second level is greater than the first level.

In some embodiments, a capacitance value between touch electrodes in the touch panel may change under the condition that the user performs the touch operation on the touch panel. The touch circuit can detect whether a user performs touch control operation on the touch control panel by detecting the capacitance value change condition between the touch control electrodes in the touch control panel.

In step 102, a current is provided to a drive circuit according to an indication signal. A first current is supplied to the driving circuit under the condition that the user does not perform touch operation on the touch panel. A second current is provided to the driving circuit under the condition that a user performs touch operation on the touch panel, and the second current is greater than the first current.

In some embodiments, under the condition that the second level is greater than the first level, if the indication signal is at the first level, it is determined that the user does not perform a touch operation on the touch panel. And if the indication signal is at the second level, it is determined that the user performs touch operation on the touch panel.

In some embodiments, under the condition that a user does not perform a touch operation on the touch panel, the first current source is controlled to provide the first current to the driving circuit, so that the driving circuit is in a low current mode. Under the condition that a user performs touch operation on the touch panel, the second current source is controlled to provide a second current to the driving circuit, so that the driving circuit is in a high-current mode.

In the circuit control method provided in the above embodiment of the present disclosure, under the condition that the user performs a touch operation on the touch panel, the driving circuit is switched to a high current mode, so that the touch panel operates normally. Under the condition that a user does not perform touch operation on the touch panel, the driving circuit is switched to a low current mode, so that the power consumption of the driving circuit is reduced, and the phenomenon that the temperature of the driving circuit is too high is avoided.

Figure 2:
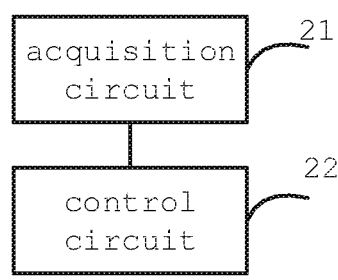
FIG. 2 is a schematic structural diagram of a circuit control device according to one embodiment of the present disclosure.

FIG. 2 is a schematic structural diagram of a circuit control device according to one embodiment of the present disclosure. As shown in FIG. 2, the circuit control device includes an acquisition circuit 21 and a control circuit 22.

The acquisition circuit 21 is configured to acquire an instruction signal for instructing whether a user performs a touch operation on the touch panel.

In some embodiments, the touch circuit is used for detecting whether a user performs a touch operation on the touch panel, and outputting corresponding indication information according to a detection result. For example, under the condition that the user does not perform a touch operation on the touch panel, the indication signal output by the touch circuit is at a first level. Under the condition that the user performs touch operation on the touch panel, the indication signal output by the touch circuit is at a second level. The second level is greater than the first level.

The control circuit 22 is configured to provide current to the drive circuit according to the indication signal. Under the condition that the user does not perform a touch operation on the touch panel, the control circuit 22 supplies a first current to the drive circuit. Under the condition that the user performs a touch operation on the touch panel, the control circuit 22 supplies a second current to the driving circuit, and the second current is greater than the first current.

In some embodiments, the control circuit 22 is configured to determine that the user does not perform the touch operation on the touch panel under the condition that the indication signal is at the first level, and to determine that the user performs the touch operation on the touch panel under the condition that the indication signal is at the second level.

In some embodiments, the control circuit 22 is configured to control the first current source to provide the first current to the driving circuit under the condition that the user does not perform a touch operation on the touch panel, so that the driving circuit is in the low current mode. The control circuit 22 is configured to control the second current source to supply the second current to the driving circuit under the condition that the user performs a touch operation on the touch panel, so that the driving circuit is in a high current mode.

In the circuit control device provided in the above embodiment of the present disclosure, under the condition that the user performs the touch operation on the touch panel, the driving circuit is switched to a high current mode, so that the touch panel operates normally. Under the condition that the user does not perform touch operation on the touch panel, the driving circuit is switched to the low current mode, so that the power consumption of the driving circuit is reduced, and the phenomenon that the temperature of the driving circuit is too high is avoided.

Figure 3:
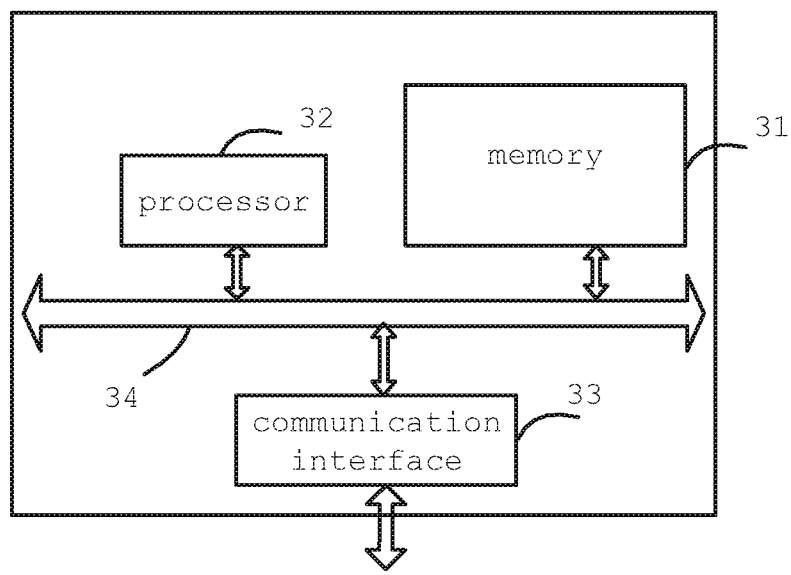
FIG. 3 is a schematic structural diagram of a circuit control device according to another embodiment of the present disclosure.

FIG. 3 is a schematic structural diagram of a circuit control device according to another embodiment of the present disclosure. As shown in FIG. 3, the circuit control device includes a memory 31 and a processor 32.

The memory 31 is used to store instructions. The processor 32 is coupled to the memory 31. The processor 32 is configured to perform the method according to any of the embodiments in FIG. 1 based on instructions stored in the memory.

As shown in FIG. 3, the circuit control device further includes a communication interface 33 for information interaction with other devices. Meanwhile, the device also comprises a bus 34, and a processor 32, a communication interface 33 and a memory 31 are communicated with each other through a bus 34.

The Memory 31 may include a Random Access Memory (RAM) or a Non-Volatile Memory (NVM). Such as at least one disk storage. The memory 31 may also be a memory array. The memory 31 may also be partitioned and the blocks may be combined into virtual volumes according to certain rules.

Further, the processor 32 may be a central processing unit, or may be an ASIC (Application Specific Integrated Circuit), or one or more Integrated circuits configured to implement embodiments of the present disclosure.

The present disclosure also provides a non-transitory computer-readable storage medium. The computer-readable storage medium stores computer instructions, and when executed by the processor, the instructions implement the method according to any one of the embodiments in FIG. 1.

Figure 4:
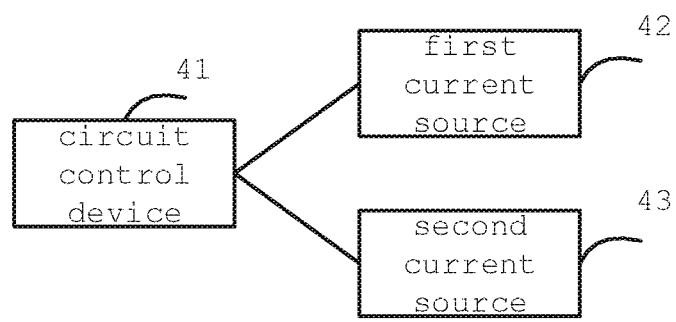
FIG. 4 is a schematic structural diagram of a time sequence control circuit according to one embodiment of the present disclosure.

FIG. 4 is a schematic diagram of a time sequence control circuit according to one embodiment of the present disclosure. As shown in FIG. 4, the time sequence control circuit includes a circuit control device 41, a first current source 42, and a second current source 43. The circuit control device 41 is the circuit control device according to any one of the embodiments of FIG. 2 or FIG. 3.

The first current source 42 is configured to supply a first current to the drive circuit under the control of the circuit control device 41. The second current source 43 is configured to supply a second current to the drive circuit under the control of the circuit control device 41.

Figure 5:
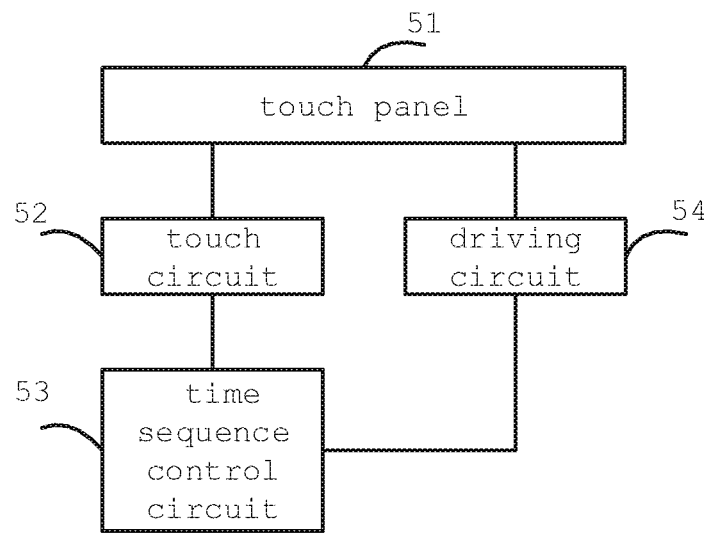
FIG. 5 is a schematic structural diagram of a display module according to an embodiment of the present disclosure.

FIG. 5 is a schematic structural diagram of a display module according to one embodiment of the disclosure. As shown in FIG. 5, the display module includes a touch panel 51, a touch circuit 52, a time sequence control circuit 53 and a driving circuit 54. The time sequence control circuit 53 is a time sequence control circuit according to any one of the embodiments in FIG. 4.

The touch circuit 52 is configured to detect whether a user performs a touch operation on the touch panel 51, and send indication information corresponding to the detection result to the time sequence control circuit 53.

It should be noted here that under the condition that the user performs a touch operation on the touch panel 51, the capacitance value between the touch electrodes in the touch panel 51 changes. The touch circuit 52 can detect whether the user performs a touch operation on the touch panel 51 by detecting a change in capacitance value between the touch electrodes of the touch panel 51.

In some embodiments, the indication signal output by the touch circuit 52 is at a first level under the condition that the user does not perform a touch operation on the touch panel 51. The indication signal output by the touch circuit 52 is at the second level under the condition that the user performs a touch operation on the touch panel 51. The second level is greater than the first level.

The time sequence control circuit 53 is configured to control the first current source to supply the first current to the driving circuit 54 under the condition that the indication signal output by the touch circuit 52 is a low-level signal. The time sequence control circuit 53 is further configured to control the second current source to provide the second current to the driving circuit 54 under the condition that the indication signal output by the touch circuit 52 is a high level signal. The second current is greater than the first current.

The driving circuit 54 is configured to drive the touch panel 51 with a current obtained under the control of the time sequence control circuit 53.

The driving circuit 54 is in the low current mode and drives the touch panel 51 with the first current under the condition that the time sequence control circuit 53 provides the first current. The driving circuit 54 is in the high current mode and drives the touch panel 51 with the second current under the condition that the time sequence control circuit 53 provides the second current.

In some embodiments, the touch panel 51 is an in-cell touch panel. For example, the touch panel 51 is a liquid crystal touch panel with a resolution of 8K in-cell.

Figure 6A:
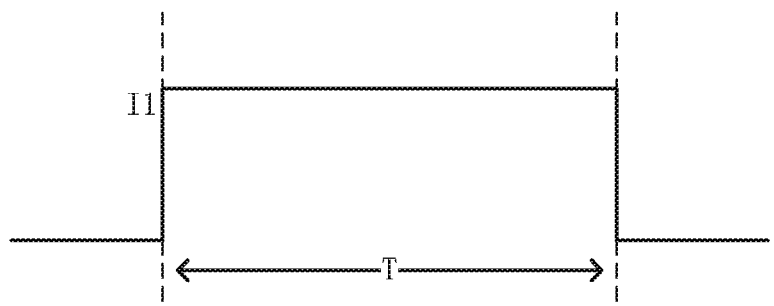
FIG. 6A to FIG. 6B are drive current time sequence diagrams according to some embodiments of the present disclosure.
Figure 6B:
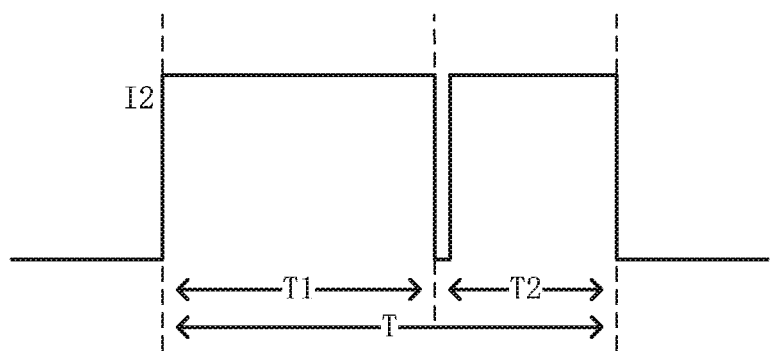

FIGS. 6A-6B are drive current time sequence diagrams according to some embodiments of the present disclosure. In some embodiments, for a 60 Hz 8K in-cell liquid crystal touch panel, the one frame scan time period is 16.7 ms.

As shown in FIG. 6A, the driving circuit 54 drives the touch panel 51 with the first current I1 under the condition that in the low current mode. Since the user does not touch the touch panel 51, the first current I1 is used for display driving of the touch panel 51 during one frame scanning time period T with a length of 16.7 ms.

As shown in FIG. 6B, the driving circuit 54 drives the touch panel 51 with the second current I2 under the condition that in the high current mode. Since the user performs a touch operation on the touch panel 51, during one frame scanning time period T with a length of 16.7 ms, the second current I2 is used for display driving of the touch panel 51 during a time period T1 (e.g., 8.7 ms) and is used for touch driving of the touch panel 51 during a time period T2 (e.g., 8 ms). In the embodiment shown in FIG. 6B, although the time for display driving is shortened, the touch panel 51 can still ensure normal display since the second current is greater than the first current.

The present disclosure also provides a display device. The display device comprises the display module related to any embodiment in FIG. 5. The display device can be any product or component with a display function, such as a display, a mobile phone, a tablet computer, a television, a notebook computer, a digital photo frame, a navigator and the like.

In some embodiments, the above-described circuits may be implemented as a general purpose Processor, a Programmable Logic Controller (PLC), a Digital Signal Processor (DSP), an Application Specific Integrated Circuit (ASIC), a Field Programmable Gate Array (FPGA) or other Programmable Logic device, discrete Gate or transistor Logic, discrete hardware components, or any suitable combination thereof, for performing the functions described in this disclosure.

So far, embodiments of the present disclosure have been described in detail. Some details well known in the art have not been described in order to avoid obscuring the concepts of the present disclosure. Those skilled in the art can now fully appreciate how to implement the teachings disclosed herein, in view of the foregoing description.

Although some specific embodiments of the present disclosure have been described in detail by way of example, it should be understood by those skilled in the art that the above examples are for illustration only and are not intended to limit the scope of the present disclosure. It will be understood by those skilled in the art that various changes may be made and equivalents may be substituted for elements thereof without departing from the scope and spirit of the present disclosure. The scope of the present disclosure is defined by the appended claims.

What is claimed is:

1. A circuit control method, comprising:
   acquiring an indication signal for indicating whether a user performs touch operation on a touch panel; and
   providing a current to a driving circuit according to the indication signal, wherein a first current is provided to the driving circuit under the condition that the user does not perform touch operation on the touch panel, and a second current larger than the first current is provided to the driving circuit under the condition that the user performs touch operation on the touch panel, a frame scanning time period T comprises a first time period T1 and a second time period T2 under the condition that the user performs touch operation on the touch panel, the driving circuit drives the touch panel with the second current for display driving during the first time period T1, and drives the touch panel with the second current for touch driving during the second time period T2, wherein the first time period T1 is greater than the second time period T2.

2. The circuit control method according to claim 1, wherein the providing the current to the driving circuit comprises:
   controlling a first current source to provide the first current to the driving circuit under the condition that the user does not perform touch operation on the touch panel; and
   controlling a second current source to provide the second current to the driving circuit under the condition that the user performs touch operation on the touch panel.

3. The circuit control method according to claim 1, wherein:
   the user is determined to not perform a touch operation on the touch panel under the condition that the indication signal is at a first level; and
   the user is determined to perform touch operation on the touch panel under the condition that the indication signal is at a second level greater than the first level.

4. A circuit control device, comprising:
   an acquisition circuit configured to acquire an indication signal for indicating whether a user performs touch operation on a touch panel; and
   a control circuit configured to provide a current to a driving circuit according to the indication signal, wherein a first current is provided to the driving circuit under the condition that the user does not perform touch operation on the touch panel, and a second current larger than the first current is provided to the driving circuit under the condition that the user performs touch operation on the touch panel, a frame scanning time period T comprises a first time period T1 and a second time period T2 under the condition that the user performs touch operation on the touch panel, the driving circuit drives the touch panel with the second current for display driving during the first time period T1, and drives the touch panel with the second current for touch driving during the second time period T2, wherein the first time period T1 is greater than the second time period T2.

5. The circuit control device according to claim 4, wherein the control circuit is configured to control a first current source to provide the first current to the driving circuit under the condition that the user does not perform touch operation on the touch panel, and to control a second current source to provide the second current to the driving circuit under the condition that the user performs touch operation on the touch panel.

6. The circuit control device according to claim 4, wherein the control circuit is configured to determine the user does not perform a touch operation on the touch panel under the condition that the indication signal is at a first level, and to determine the user performs touch operation on the touch panel under the condition that the indication signal is at a second level greater than the first level.

7. A circuit control device, comprising:
a memory configured to store instructions;
a processor coupled to the memory, wherein based on instructions stored by the memory, the processor is configured to:
 acquire an indication signal for indicating whether a user performs touch operation on a touch panel; and
 provide a current to a driving circuit according to the indication signal, wherein a first current is provided to the driving circuit under the condition that the user does not perform touch operation on the touch panel, and a second current larger than the first current is provided to the driving circuit under the condition that the user performs touch operation on the touch panel, a frame scanning time period T comprises a first time period T1 and a second time period T2 under the condition that the user performs touch operation on the touch panel, the driving circuit drives the touch panel with the second current for display driving during the first time period T1, and drives the touch panel with the second current for touch driving during the second time period T2, wherein the first time period T1 is greater than the second time period T2.

8. The circuit control device according to claim 7, wherein the processor is further configured to:
 control a first current source to provide the first current to the driving circuit under the condition that the user does not perform touch operation on the touch panel; and
 control a second current source to provide the second current to the driving circuit under the condition that the user performs touch operation on the touch panel.

9. The circuit control device according to claim 7, wherein the processor is further configured to:
 determine the user does not perform a touch operation on the touch panel under the condition that the indication signal is at a first level; and
 determine the user performs touch operation on the touch panel under the condition that the indication signal is at a second level greater than the first level.

10. A time sequence control circuit, comprising:
the circuit control device according to claim 4;
a first current source configured to provide a first current to a driving circuit under the control of the circuit control device; and
a second current source configured to provide a second current to the driving circuit under the control of the circuit control device.

11. A display module, comprising:
a time sequence control circuit, comprising:
 a circuit control device, comprising:
  an acquisition circuit configured to acquire an indication signal for indicating whether a user performs touch operation on a touch panel; and
  a control circuit configured to provide a current to a driving circuit according to the indication signal, wherein a first current is provided to the driving circuit under the condition that the user does not perform touch operation on the touch panel, and a second current larger than the first current is provided to the driving circuit under the condition that the user performs touch operation on the touch panel, a frame scanning time period T comprises a first time period T1 and a second time period T2 under the condition that the user performs touch operation on the touch panel, the driving circuit drives the touch panel with the second current for display driving during the first time period T1, and drives the touch panel with the second current for touch driving during the second time period T2, wherein the first time period T1 is greater than the second time period T2;
 a first current source configured to provide a first current to a driving circuit under the control of the circuit control device; and
 a second current source configured to provide a second current to the driving circuit under the control of the circuit control device;
the touch panel;
a touch circuit configured to detect whether the user performs touch operation on the touch panel and send indication information corresponding to a detection result to the time sequence control circuit; and
a driving circuit configured to drive the touch panel using a current obtained under control of the time sequence control circuit.

12. The display module according to claim 11, wherein the driving circuit is configured to use a first current for display driving of the touch panel under the condition that the obtained current is the first current.

13. The display module according to claim 12, wherein the driving circuit is configured to use a first portion of a second current for display driving of the touch panel and a second portion of the second current for touch driving of the touch panel under the condition that the obtained current is the second current greater than the first current.

14. The display module according to claim 11, wherein the touch panel is an in-cell touch panel.

15. A display device comprising the display module according to claim 11.

16. A non-transitory computer-readable storage medium that stores computer instructions which, when executed by a processor, implement the method according to claim 1.

* * * * *